Sept. 19, 1950

G. W. FLETCHER 2,523,205

TRAILER CAMP CAR

Filed April 23, 1947

INVENTOR.
George W. Fletcher
BY
Att'y

Sept. 19, 1950 G. W. FLETCHER 2,523,205
TRAILER CAMP CAR
Filed April 23, 1947 3 Sheets-Sheet 2

INVENTOR.
George W. Fletcher
BY
Att'y

Sept. 19, 1950 G. W. FLETCHER 2,523,205
TRAILER CAMP CAR
Filed April 23, 1947 3 Sheets-Sheet 3
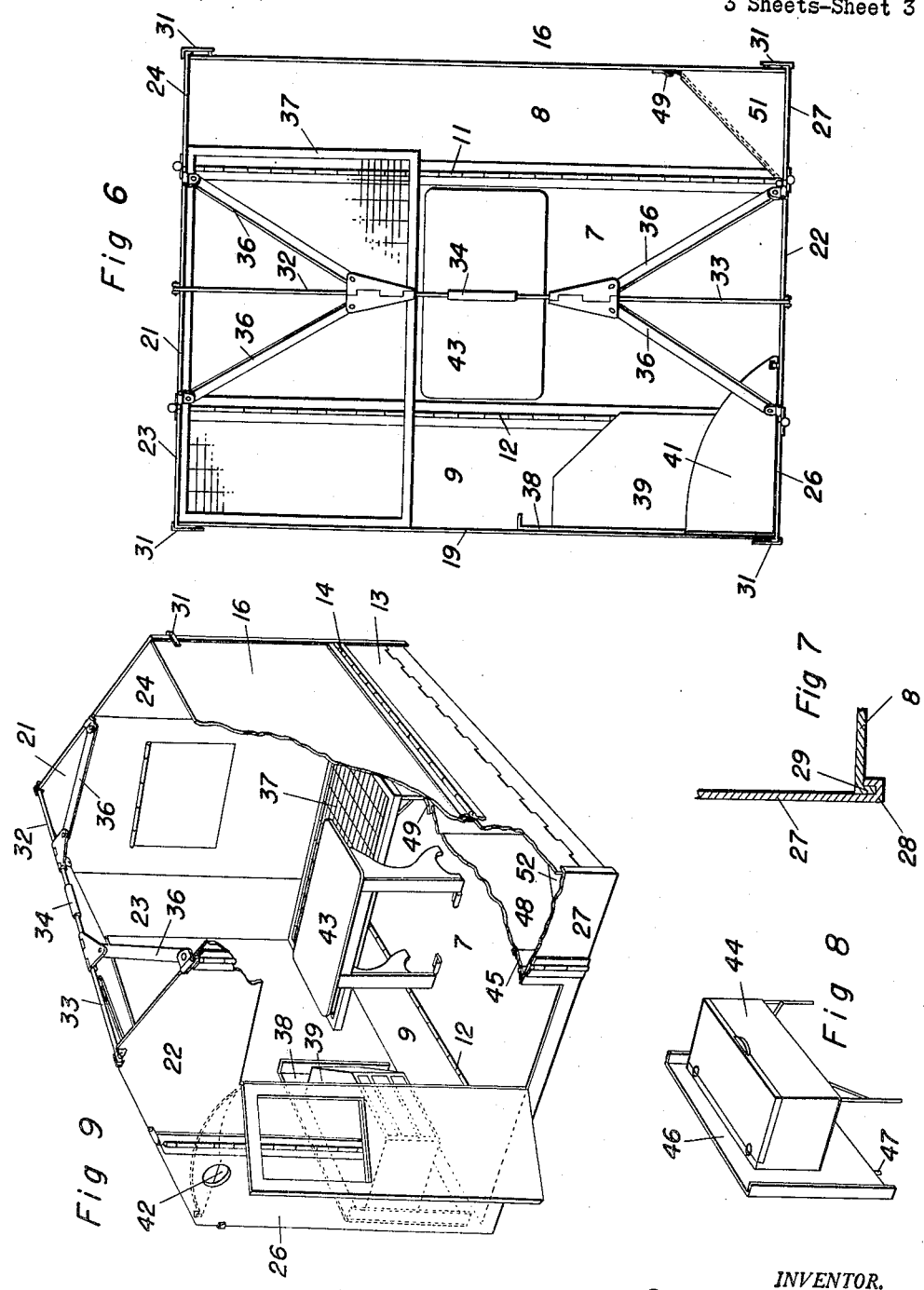
INVENTOR.
George W. Fletcher
BY
Att'y Patented Sept. 19, 1950

2,523,205

UNITED STATES PATENT OFFICE 2,523,205

TRAILER CAMP CAR

George W. Fletcher, San Francisco, Calif.

Application April 23, 1947, Serial No. 743,277

2 Claims. (Cl. 20—2)

This invention relates to improvements in trailer camp car.

The principal object of this invention is to provide a trailer which when folded forms a substantially rectangular structure, and when opened forms a house-like structure of considerable size.

A further object of this invention is to produce a trailer camp car which is readily transportable, one which is easy to convert into a house-like structure, and one which will accommodate all of the ordinary furniture for the house structure such as bed, table, ice-box, drawer cabinet, etc.

A still further object of this invention is to produce a device of this character which has rigidity when erected as a house structure in contradistinction to the ordinary tent structure.

Another object is to produce a device which when in folded condition also provides space for luggage and other camping equipment.

A still further object is to produce a device wherein all of the parts are so nested that they lock into a rigid structure free from objectionable rattles.

Other objects and advantages will be apparent during the course of the following description.

In the accompanying drawings forming a part of this specification and in which like numerals are employed to designate like parts throughout the same:

Fig. 6 is a top plan view of the house structure in erected position.

Fig. 7 is a fragmentary cross sectional view showing the manner in which the floor boards are locked to the end wings.

Fig. 8 is a perspective view of the combined ice-box and tail gate, and

Fig. 9 is a perspective view partly broken away of the device in erected position.

Campers generally employ an ordinary box-like trailer in which tents, portable houses and other camping equipment is stored and transported from place to place. Such an arrangement necessitates careful packing to avoid shifting of the load, objectionable rattles, etc. It is also difficult to unload the trailer, erect the tent and move the various pieces of equipment into the tent.

Applicant has, therefore, devised a trailer car which to all intents and purposes when folded and is being moved along the highway resembles an ordinary box trailer, but when unfolded and erected presents the appearance in contour and outline of a small one room cabin.

In the accompanying drawings wherein for the purpose of illustration is shown a preferred embodiment of my invention, the numeral 5 designates the running gear as a whole which serves to support a chassis 6 upon which my structure is supported.

At 7 I have shown a floor which covers the entire area of the chassis and has hinged thereto floor-board sections 8 and 9 hinged as at 11 and 12 respectively.

Figure 1:
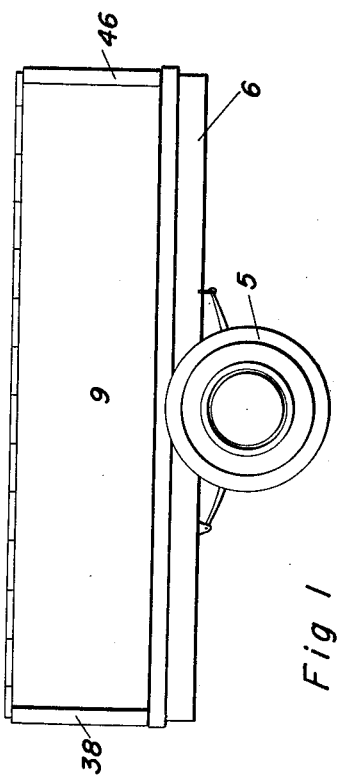
Fig. 1 is a side elevation of my trailer as the same would appear in closed position.
Figure 3:
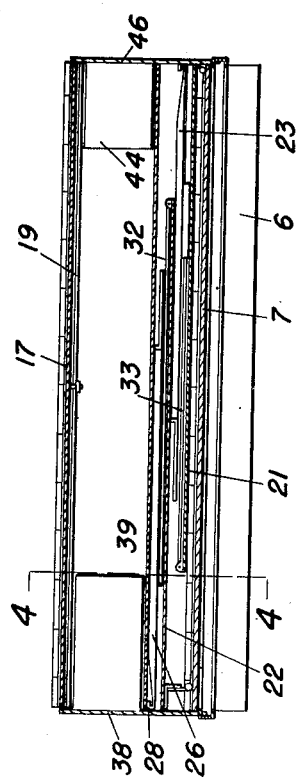
Fig. 3 is a cross sectional view taken on the line 3—3 of Fig. 4.

These floor-boards 8 and 9 also form the sides of the trailer body when the same is closed, as shown in Fig. 1.

Hinged to the floor-board 8 is a side section 13, and hinged to this side section, as at 14, is a second side section 16.

Hinged to the floor section 9 is a side section 17 to which is hinged, as at 18, a side section 19.

The parts thus far described complete the floor and the two sides.

The end sections each comprise a central portion, as shown at 21 and 22, to which are hinged end-wings 23—24 and 26—27 respectively. Each one of these end-wings has a return bend on its lower end, as shown at 28 in Fig. 7 which is engaged by a turned down end 29 formed on each end of the floor-boards 8 and 9. Thus, the wings are locked to the floor-boards when in open position.

The side pieces are held to the end-wings by fasteners 31.

Figure 5:
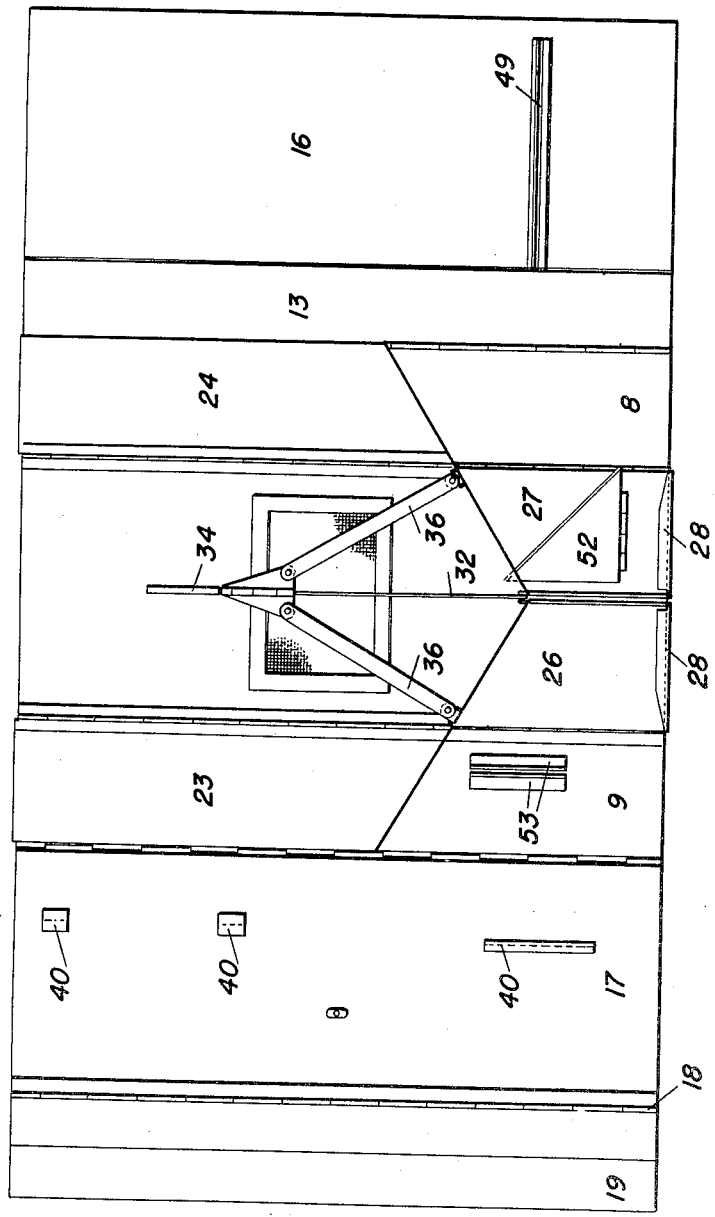
Fig. 5 is a top plan view of Fig. 1 with the sides of the house structure in unfolded position.

Pivoted to the apex of the end pieces 21 and 22 are rods, as shown at 32 and 33 respectively, the ends of which rods are held together by a telescoping piece 34 and are braced by sliding braces 36 which permit the rods 32 and 33 to fold over and lie down flat upon the end pieces as shown in Fig. 5 when the structure is in folded position.

Suitable clips 40 on the ends and one side serve to support a bed frame 37 and also serve to support the tail gate 38 upon which is mounted a drawer cabinet 39.

A curved hood 41 serves to conduct fumes arising from a stove mounted upon the cabinet and direct the same outward through an opening 42 in the wing 26.

Figure 2:
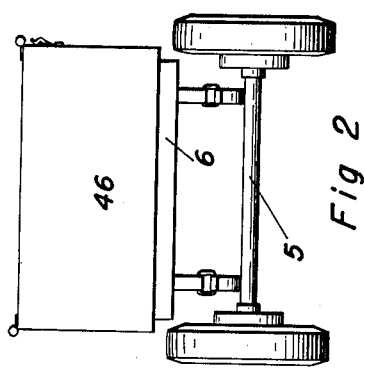
Fig. 2 is a rear elevation of Fig. 1 and looking from the right of the drawing.

A folding table is shown at 43 and an ice box is shown at 44, which is mounted upon the tail gate 46, both the tail gates 38 and 46 having downwardly extending pins 47, which engage the chassis when the tail gates are in the position of Fig. 2.

The end members 21 and 22 are provided with a window opening and a door opening.

A closet is provided by hinging to the end member 22 a frame 45 having a door 48, which frame has its free end engaged by a clip 49 formed upon the side piece 16. Hinged top and bottom pieces 51 and 52 serve to complete the closet and render the same rodent proof.

A canvas cover is placed over the entire structure in order to form a roof.

Figure 4:
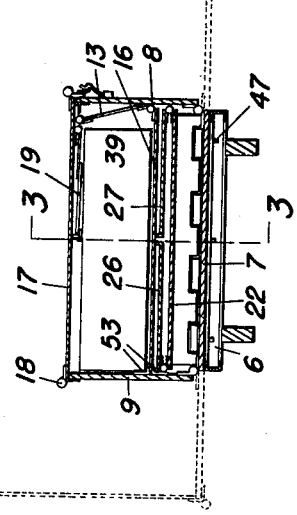
Fig. 4 is a cross sectional view taken on the line 4—4 of Fig. 3.

By viewing Fig. 4, it will be noted that clips 53 serve to position the free end of the side piece 16, which side piece in turn bears upon the underlying end pieces, and consequently prevents the same from rattling; also, that the space between the side-piece 16 and the top of the folded trailer forms a space for both the chest of drawers and the ice box, as well as any camping equipment which it is desired to store therebetween.

When the parts are erected, as shown in Fig. 9, it will be apparent that I have produced a livable and comfortable structure in which sleeping, cooking and eating may be easily conducted, and a structure which may be locked when the user is away from camp, thereby insuring safety against theft, etc.

It will thus be seen that I have produced a structure which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A trailer body including a rectangular floor member having side and end edges, lateral extensions hinged to the side edges, side walls hinged to said lateral extensions, said side walls extending vertically upward from said lateral extensions, said side walls each having a lower section whereby the wall is hinged to a lateral extension and having an upper section extending upwardly from the lower section, hinges each connecting a lower section and an upper section, said hinges extending the full lengths of said sections to form a weather tight joint, end walls hinged to the end edges of the floor and adapted to fill the space between these side walls and having their lateral edges secured to the adjacent edges of said side walls, said lateral extensions being foldable vertically upward from the floor, and the side walls being foldable one over the other parallel to the floor upon the lateral extensions being folded upward.

2. A trailer body including a rectangular floor member having side and end edges, lateral extensions hinged to the side edges, side walls hinged to said lateral extensions, said side walls extending vertically upward from said lateral extensions, said side walls each having a lower section whereby the wall is hinged to a lateral extension and having an upper section extending upwardly from the lower section, hinges each connecting a lower section and an upper section, said hinges extending the full lengths of said sections to form a weather tight joint, end walls hinged to the end edges of the floor and adapted to fill the space between these side walls and having their lateral edges secured to the adjacent edges of said side walls, said lateral extensions being foldable vertically upward from the floor, the side walls being foldable one over the other parallel to the floor upon the lateral extensions being folded upward, and closure means fitting between the floor and side walls at each end.

GEORGE W. FLETCHER.

REFERENCES CITED

The following references are of record in the file of this patent:

UNITED STATES PATENTS

| Number | Name | Date |
| --- | --- | --- |
| 1,578,390 | Brown | Mar. 30, 1926 |
| 1,917,824 | Burns | July 11, 1933 |
| 2,152,713 | Stewart | Apr. 4, 1939 |
| 2,298,530 | Fletcher | Oct. 13, 1942 |
| 2,298,619 | Gorton | Oct. 13, 1942 |
| 2,342,264 | Fuehrer | Feb. 22, 1944 |
| 2,359,577 | Patrick | Oct. 3, 1944 |